July 15, 1941.  W. BLACKMORE  2,249,596

JOURNAL BOX

Filed June 8, 1939  2 Sheets-Sheet 1

INVENTOR
William Blackmore
BY Albert E. Field
ATTORNEY

July 15, 1941.  W. BLACKMORE  2,249,596
JOURNAL BOX
Filed June 8, 1939  2 Sheets-Sheet 2
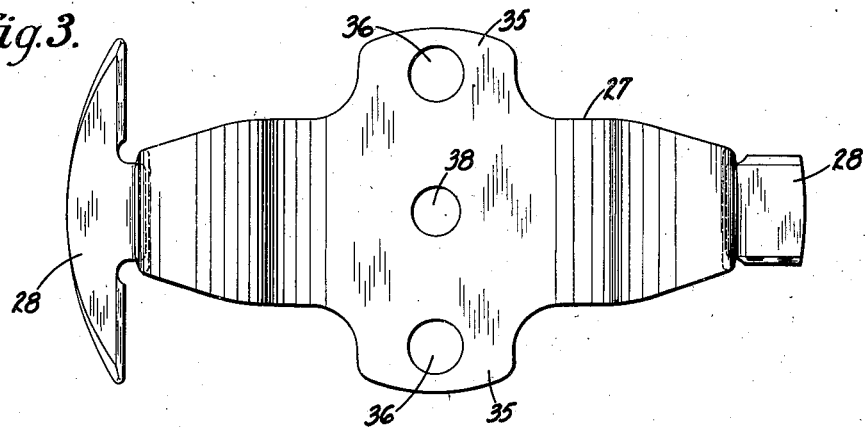
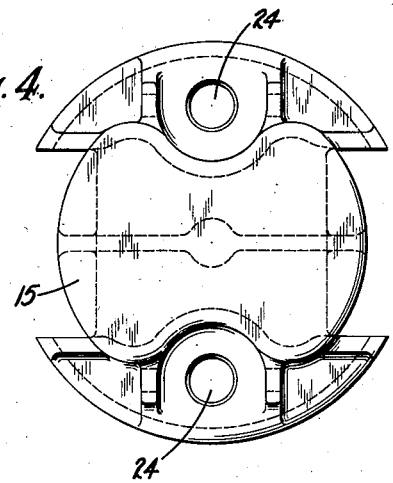
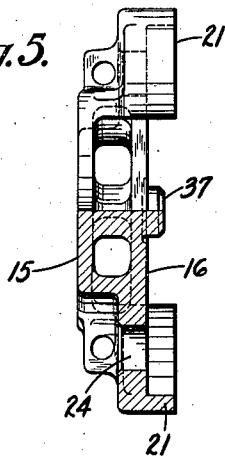
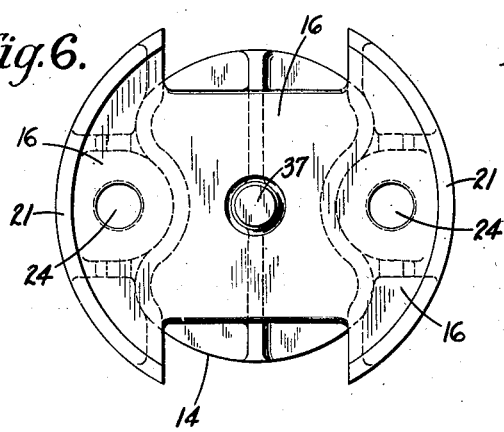
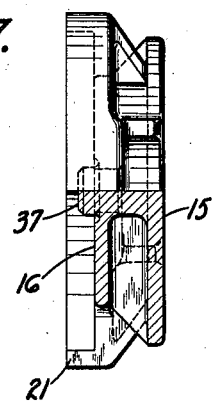
INVENTOR
William Blackmore
BY Albert E. Field
ATTORNEY Patented July 15, 1941

2,249,596

UNITED STATES PATENT OFFICE 2,249,596

JOURNAL BOX

William Blackmore, Cleveland Heights, Ohio, assignor to National Malleable and Steel Castings Company, Cleveland, Ohio, a corporation of Ohio Application June 8, 1939, Serial No. 278,102

5 Claims. (Cl. 308—86)

This invention relates to railway journal boxes and more particularly those provided with a free oiling system and with means to receive the end thrust of the journal.

The present trend, particularly in passenger car journal boxes, is toward the provision of means on the end of the journal and box to resist lateral thrusts of the journal relative to the car, and in many cases this end thrust is cushioned by the use of suitable resilient means. In connection with a journal box provided with a free oiling system the problem has arisen of securely fastening the oil conveying member and the thrust block on the end of the journal so that neither one will be jarred loose by the car passing over rail joints, switches and the like.

An object of the present invention is the provision of novel means for securing the oil conveying member between the end of the journal and thrust member, in such manner that any shearing stresses are placed on the thrust block rather than upon the retaining bolts.

A further object of the invention is the provision of an oil conveying member having a center portion extending over substantially the entire area of the end of the journal so that the thrust block will not be tipped by unequal tightening of the retaining bolts during application thereof to the journal and thus with my invention overstressing of one or the other of the retaining bolts is prevented.

Other objects and advantages of the invention will be apparent from the following description taken in conjunction with the drawings, in which:

Figure 3 is a plan view of the oil conveying member.

Figure 4 is a plan view of the thrust member.

Figure 5 is an elevational view partly in vertical section of the thrust member shown in Fig. 4.

Figure 6 is a plan view showing the opposite side of the thrust member; and

Figure 7 is an elevational view partly in vertical section, which was taken at right angles to the section shown in Fig. 5.

Figure 1:
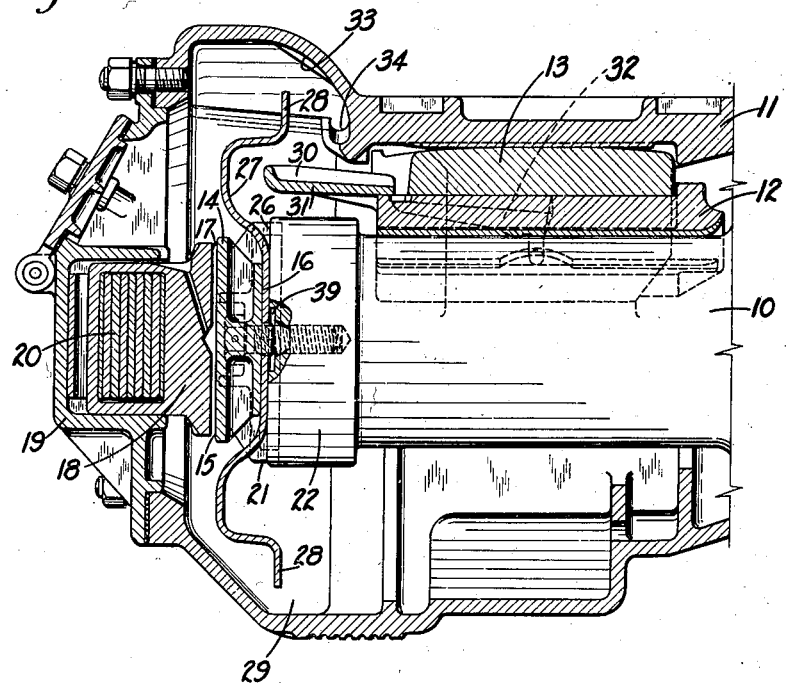
Figure 1 is a longitudinal vertical sectional view through a journal box embodying my invention.
Figure 2:
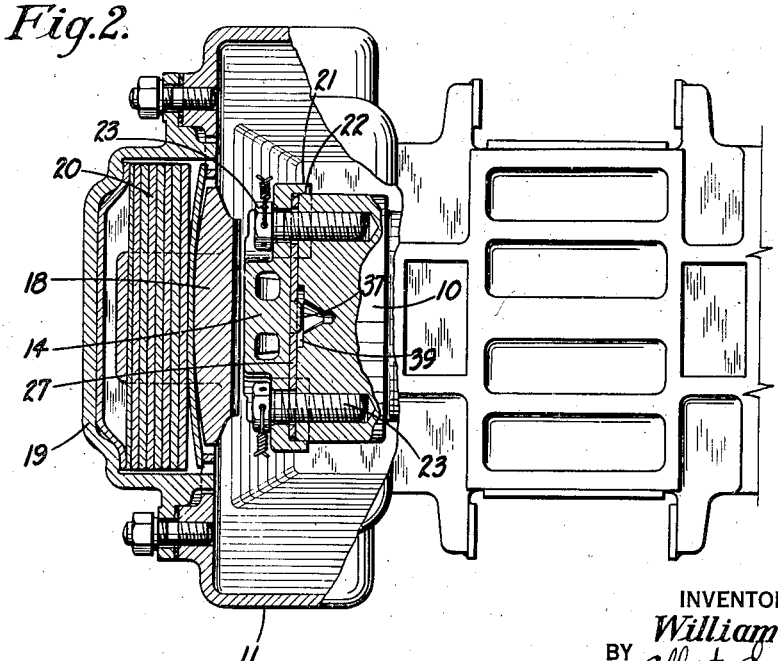
Figure 2 is a plan view partially in horizontal section through the journal box shown in Fig. 1.

In the drawings, the journal 10 extends into journal box 11 through an opening in the rear end thereof. Between the journal and the top of the box is a bearing member 12 and the usual wedge 13. Mounted on the end of the journal is a thrust member 14 having a surface 15 adapted to engage a surface 17 on thrust receiving member 18 which is shown resiliently mounted in the cover 19 of the journal box by means of a leaf spring 20. Thrust member 14 is formed with flanges 21, on opposite sides of a seating portion 16, which overlap portions of surface 22 on the end of the journal to position the thrust block thereon and to receive blows transmitted transversely of the journal. Retaining bolts 23 secure the thrust member on the end of the journal. It will be observed that openings 24 through the thrust member are larger than the diameter of the bolts so that the latter are not subjected to shearing stresses due to the jarring action of the journal box in passing over rail joints and the like.

Between seating portion 16 of thrust member 14 and the end surface 26 of the journal, is an oil conveying member 27 having end portions 28 adapted upon rotation of the journal to carry oil from an oil reservoir 29 in the bottom of the box upwardly to points for delivery to the bearing surfaces of bearing member 12 and the journal. At slow speeds the oil drips from portions 28 into a trough 30 formed in a projection 31 extending forwardly from wedge member 13. From trough 30 the oil is conducted through openings 32 in the bearing member to the bearing surfaces of the bearing member and journal. At high speeds, oil is thrown from portions 28 of the oil conveying member onto the upper inner surface 33 of the journal box, where it flows into grooves 34 and then into trough 30, where it is conducted to the journal.

At the center of member 27 are lateral projections 35 which extend radially outwardly beyond bolts 23 so as to overlie seating portion 16 of the thrust member for substantially the width of the journal. Upon tightening bolts 23, whether they be tightened unequally or the same amount, there will be no tendency to tip the thrust member, as would be the case if the oil conveying member were not provided with lateral projections 35. The bolts therefore may be tightened in such a manner that the stresses therein are substantially equal. Projections 35 are formed with openings 36 to permit passage of the retaining bolts. At the center of thrust member 14 is an inward projection 37 which passes through an opening 38 in the oil conveying member to position the latter with respect to the thrust member. The end of the journal may be recessed, as at 39, to prevent contact of projection 37 with the journal so that bolts 23 may pull the oil conveying member tight against the journal through the medium of thrust member 14.

Details of the resilient thrust block mounted in the cover of the journal box are more fully described and claimed in my copending application Serial No. 225,972, filed August 20, 1938, now Patent No. 2,208,658, of July 23, 1940.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A journal box having a journal therein, a thrust member on the end of said journal, said member having a flat inner surface facing the end of the journal, an oil conveying member having a widened central portion between said surface and the end of said journal, means on said thrust member on each side of said widened portion for positioning said thrust member transversely of said journal, and retaining means passing through said members for securing the latter to said journal.

2. A journal box having a journal therein, a thrust member on the end of said journal having a channel extending radially across the side thereof facing the journal, an oil conveying member in said channel between said thrust member and the end of said journal, said channel comprising a pair of axially extending flanges on said thrust member for positioning the latter transversely of said journal, and retaining means passing through said members for securing the latter to said journal.

3. A journal box having a journal therein, a thrust member mounted on the end of said journal having a pair of spaced flanges extending rearwardly into overlapping relation with said journal and having a forward surface adapted to transmit thrusts to said journal, an oil conveying member between said thrust member and the end of said journal, and retaining means extending through said members for securing the latter to said journal, said thrust member having an integral projection extending through said oil conveying member for positioning the latter relative to said thrust member.

4. A journal box having a journal therein, an oil conveying member on the end of said journal having a widened central portion extending substantially the width thereof, and a thrust member adjacent the end of said journal securing said first named member to the journal, said thrust member comprising a thrust receiving portion on one side and a seating portion on the other side engaging said central portion, and a pair of flanges extending from said seating portion and overlapping portions of said journal for resisting movement of said thrust member laterally of said journal.

5. A journal box having a journal therein, a thrust member on the end of said journal, said member comprising a thrust receiving portion on one side and a seating portion on the other side, a pair of flanges extending from said seating portion and overlapping portions of said journal for resisting movement of said member laterally of said journal, an oil conveying member between said thrust member and the end of the journal having a widened central portion in engagement with said seating portion, and retaining means extending through said members for securing the latter to said journal.

WILLIAM BLACKMORE.